Aug. 15, 1961 H. C. WARD, JR., ET AL 2,996,632
STATOR CAN SUPPORT
Filed Dec. 11, 1958
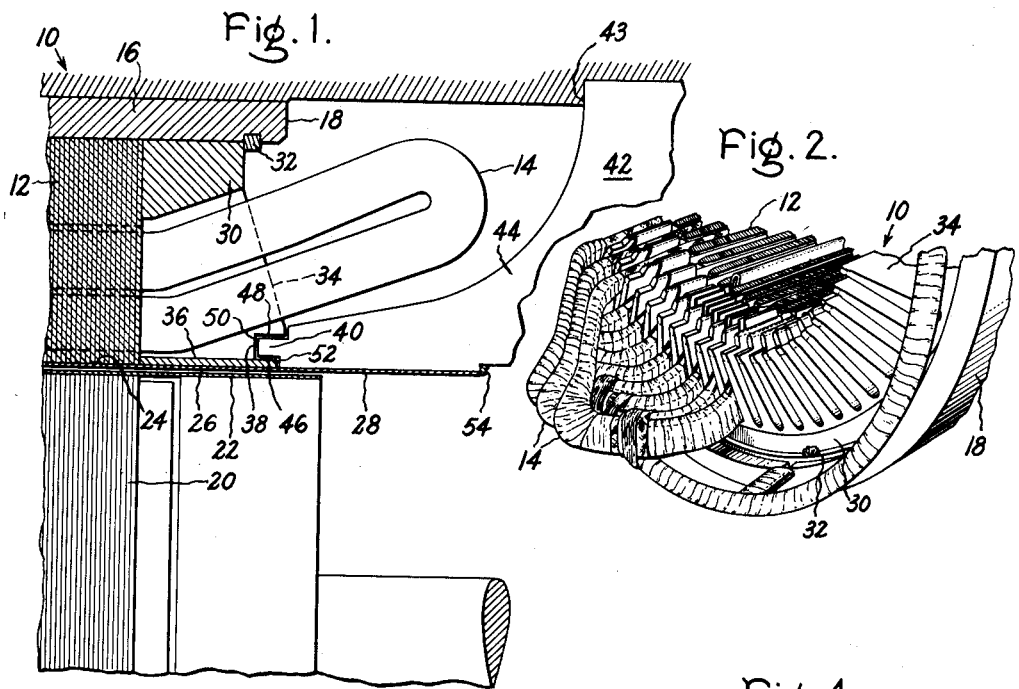
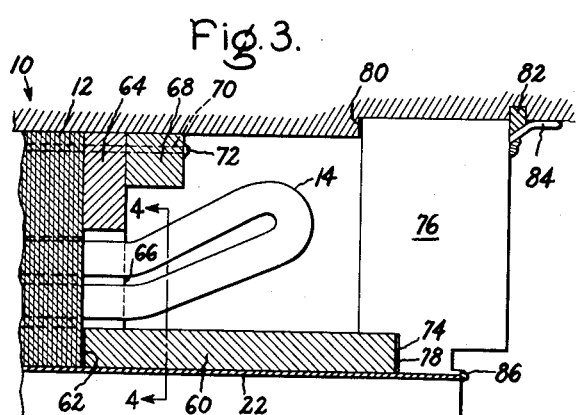
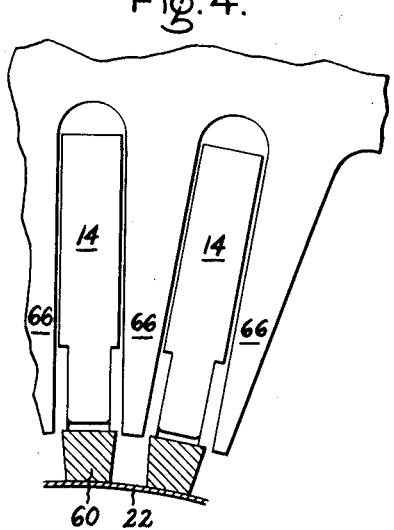
Inventors:
James A. Walsh,
Howard C. Ward, Jr.
by James R. Campbell
Their Attorney

United States Patent Office 2,996,632
Patented Aug. 15, 1961

2,996,632
STATOR CAN SUPPORT
Howard C. Ward, Jr., and James A. Walsh, Schenectady, N.Y., assignors to General Electric Company, a corporation of New York
Filed Dec. 11, 1958, Ser. No. 779,703
8 Claims. (Cl. 310—86)

The invention described herein relates to dynamo-electric machines and more particularly to a canned motor having an improved arrangement for providing mechanical support to that portion of the stator can extending from the stator core.

The usual construction of canned motors takes the form of a stator comprising a plurality of laminations enclosed in a frame and equipped with a steel can expanded into a complete contact with the edges of the laminations forming the stator bore. A squirrel cage rotor is mounted for rotation in the stator and is equipped with a similar can shrunk onto its peripheral surface such that the radial distances between rotor and stator cans constitute the air gap for the motor. In many instances, the can extends a distance beyond the stator bore to provide a large cavity between it and the frame enclosing the stator, for housing the end turns extending from coils mounted in conductor slots in the laminations. Since a fluid, such as a high temperature gas or liquid, is circulated at a high pressure in the air gap, e.g., 2500 p.s.i., it is necessary to provide a firm backing for that portion of the stator can which extends beyond the stator core while simultaneously requiring the construction to perform a sealing function.

Prior art machines of this type utilize an annular member placed in axial contact with the laminations and are equipped with fingers extending inwardly for positioning the end turns in a desired location in the machine. An annular backup plate is positioned between the annular member with its inwardly directed fingers and the stator can to provide the necessary support for the can for withstanding hydraulic pressures existing on the air gap side thereof. Additional cylindrical rings are axially spaced along the machine axis and placed in abutting relationship with each other for supporting the can and for providing the necessary strength for resisting forces acting on their inner surfaces. The rings engage one another and the stator frame to provide a dead air space in which the end turns are located, and which is not accessible to the water circulated in the air gap. The first of the axial rings has a small diameter which engages the can and is spaced from the end turns. The next or lower ring, considering the motor as being placed in a vertical position, extends past the end of the can along its inner diameter and has its outer peripheral surface in engagement with the inner surface of the frame thereby to form the dead air space for the coil end turns. Ingress of fluid to the vicinity of the end turns is precluded by heavy welded seals.

Another design of canned motors consists in having the dead air space filled with an oil which is placed under the same pressure as the fluid being circulated in the air gap.

The objection to the latter type construction is that the likelihood exists of oil leaking into the fluid circulated in the air gap, thereby contaminating it to an undesirable degree.

The other constructions described above which utilize parts capable of absorbing large stresses while providing watertight integrity, do not employ clearances between the parts but rely on the massive size of the various elements for withstanding pressure. Heavy welds are therefore used for completely sealing the unit. In machines constructed in this manner, the stator coils are not accessible for maintenance or repair because of the sealed construction. Access is accomplished only by milling out the large welds which in the usual case are 1–1¼ inch thick. The milling process creates heat, which combines with the physical stresses imposed on the parts during removal of the weld material, to cause a slight deformation in parts attached to and positioned adjacent the weld. If the milling process is not accurately controlled and little or no clearance exists between the various rings, the resulting deformation precludes insertion of a new ring in the machine. Nevertheless, the parts already have been stressed by the original weld and even if a new ring could be substituted, the excessive heat resulting from making a new weld will distort the parts to a degree sufficient to create a weak structure. This results from the fact that the rings utilized for imparting strength and rigidity to the unit will be pulled away from their seats, thus permitting additional deformation under the high pressures to which they thereafter will be subjected.

The primary object of our invention therefore is to eliminate the above disadvantages by providing mechanical support to that part of the stator can extending outwardly from the bore. The support is obtained by supplying structural parts having clearances therebetween for absorbing stresses resulting from application of hydraulic forces in the air gap and thereby permitting the use of relatively small welds which are easily removed for access to the end turns.

In carrying out our invention, we provide a cylindrical shaped finger flange positioned axially of the laminations and employed for providing restraint to the punchings The vertical flange is equipped with a plurality of fingers directed inwardly and spaced a distance to receive the coil end turns. A backup plate in axial contact with the laminations is positioned inwardly of the finger flange and in contact with the outer surface of the can for providing firm and rigid support thereto. A trapezoidal shaped ring equipped with an upper end of reduced diameter engages a shoulder provided circumferentially in the fingers of the flange. Clearance in the neighborhood of one to about ten mils is provided completely around the square end of the trapezoidal ring adjacent the finger flange. The construction provides continuity of support for the stator can from a point on the stator to the end of the can and is designed with sufficient clearance among the parts to absorb the stresses which are imposed thereon by the hydraulic forces in the air gap. The use of very small seal welds permits complete sealing of the end turns from the air gap.

While the specification concludes with claims particularly pointing out and distinctly claiming the subject matter which we regard as our invention, it is believed the invention will be better understood from the following description taken in connection with the accompanying drawing in which:

FIGURE 1 is a view in elevation, partly in section, of an end of a canned motor having parts illustrating the invention;

FIGURE 2 is a perspective view of the small portion of the motor illustrated in FIGURE 1;

FIGURE 3 is a modification of the invention; and

FIGURE 4 is a view taken on lines 4—4 of FIGURE 3

Referring now to the drawings wherein like reference characters designate like or corresponding parts throughout the several views, there is shown in FIGURES 1 and 2 a stator core 10 comprising a plurality of lamination 12 having conductor slots therein for receiving coils having end turns 14 projecting outwardly from the stator The stator is enclosed within a stacking shell 16 and ha a cylindrical member 18 extending axially therefrom in direction towards the bottom end of the machine. A cylindrical can 24 is expanded into contact with the opening provided by the bore in the laminations. A squirrel cage rotor 20 is arranged for rotation within the stator and is equipped with a like cylindrical can 22 shrunk onto its outer peripheral surface, and the disposition of the cans is such as to provide an air gap 26 therebetween.

This invention is directed to a construction for providing continuous mechanical support to the stator can throughout that portion 28 of its length which extends beyond the stator core. As is evident, the major portion of the can is supported by the stator laminations.

In the specific application of the canned motor described herein, liquid at 2000 p.s.i. pressure is circulated within the air gap, thus subjecting all of the parts therein to this high pressure. The cans, however, are very thin, approximately .030 inch thickness, and small discontinuities in the structure providing support to the can against such pressures constitute a hazard to the can integrity, since by subjecting it to abrupt shear loading, might lead to fracture or fatigue failure. Small dimensional variations have been found highly desirable between the parts to account for manufacturing tolerances, unequal heating, and the like, and for providing a space into which the various parts can expand when subjected to the pressures. These dimensional variations, however, are not of sufficient size to affect the can integrity.

In the particular arrangement, finger flange 30 is placed in axial contact with the end of the laminations and serves to provide axial restraint to the punchings. The finger flange maintains the pressure in the lamination stack by a shear key 32 positioned in a groove formed in the stacking shell and having a part in engagement with an outermost edge of the flange. The finger flange further is provided with a plurality of fingers 34 extending inwardly toward the stator bore and being spaced a distance for receiving the individual end turns 14 of the motor. As illustrated in FIGURE 1, the flange 30 terminates at a point considerably remote from the stator can and the space between the can and the inner peripheral surface formed by the flange fingers 34 is occupied by a cylindrical backing plate 36. When the can is subjected to pressure, force is transmitted through the can to the ring and to the fingers 34 attached to the finger flange. Although the can and the backing plate 36 are of relatively thin construction, they nevertheless are strong enough to prevent the can from buckling into the area existing between fingers on the finger flange. The radial load of this portion of the structure is therefore transmitted through the cylindrical member 36 and the fingers 34 to the solid portion 30 of the finger flange and the stacking shell.

The outermost or lower part of the flange fingers 34, considering the motor placed in vertical position, is equipped with a cutout portion or shoulder 38 into which a cylindrical end 40 of a trapezoidal shaped ring 42 is positioned. The construction of the trapezoidal ring 42 and the function it serves is more clearly described in the patent application of A. W. Brunot Serial No. 779,978, filed December 12, 1958, entitled "Dynamoelectric Machine," assigned to the same assignee as the present invention and filed concurrently herewith. As described in that application, the upwardly extending portion 44 of the trapezoidal ring is of sufficient cross section to absorb the forces exerted by the hydraulic pressures in the air gap. Nevertheless, a very small degree of movement of end 40 takes place and in order to accommodate such movement without subjecting the connected parts to undue pressures, a clearance is provided completely around the cylindrical end 40 and the parts into which it is fitted. The end 40 of the ring 42 therefore is of a cantilever type support which extends over the end turns and since it rests in shoulder 38 formed in the finger flange, the end 40 and the flange are positioned radially with respect to each other. The backing plate 36 overlaps both the inner portion of the finger flange 30 and the projecting end 40 of the trapezoidal ring.

The clearances chosen between the various parts in the area where the end 40 of the ring is positioned in the shoulder 38 of the finger flanges is important because too little clearance may result in deformation of the relatively thin parts when subjected to a load, and too great clearance, particularly near the air gap, will permit the can to be squeezed into the axial space between the parts with the likelihood of its failing structurally. The clearance provided at 46 is in the neighborhood of 2–3 mils while the clearance 48 on the outer side is in the neighborhood of 4–9 mils. It will be seen that as the radially applied forces are exerted against the can and the backing plate 36, the backing plate 36 must expand 2–3 mils before contacting the end 40 of ring 42. This absorbs a considerable amount of force and after contact between the ring 36 and cylindrical end 40 is established, the force will be further absorbed by the finger flange and stacking shell 16. Likewise, the clearance of 4–9 mils at 48 is sufficient to permit portion 44 of the trapezoidal ring to absorb a considerable amount of the radially acting forces prior to engaging the outermost portion of the shoulder cut in the finger flanges. When contact at this point is made, the forces also will be distributed through the fingers to the flange and the stacking shell. It is therefore evident that the upper part of the trapezoidal ring and the backing plate 36 is not of sufficient strength to withstand the forces in the air gap and the load therefore must be shared with the finger flange 30 with its attached fingers 34.

An additional clearance 50 in the neighborhood of 1–10 mils is provided between the uppermost end of end 40 and the fingers 34 and the lowermost point 52 on ring 36. This clearance is necessary to insure the seating of ring 42 in shoulder 43 to resist movement of ring 42 in an axial direction as the result of the forces acting on the opposite end of the ring. It will be apparent that if no clearance were provided between these points, but a clearance existed at 43, the load would be imposed through the trapezoidal ring directly to the backing plate 36 which is in contact with the punching stack and cause deformation of the ring and stack and failure of the can weld at 54. Also, if the clearance 52 is too great, the can will be pressed inwardly into the small axial space with the accompanying possibility of can failure.

As a result of utilizing the kind of construction described above, a degree of flexibility is imparted to the structure which permits the parts to expand a predetermined amount without adversely affecting the operation of the machine. In view of this, very small light welds can be used in the various portions of the machine to make the end turn space watertight, such as a weld applied to the lowermost trapezoidal ring 42. The important use of small welds is that they make possible the removal of the trapezoidal ring 42 for providing accessibility to the coils and other parts without deforming the structures. Also, since the stresses to which the parts are subjected during milling are not great, and since only relatively small amounts of heat are conducted to the adjoining surfaces when replacing the ring, deformation of the parts does not occur during ring replacement.

In the modification of FIGURE 3, the end turns 14 have been moved radially outwardly from the stator bore a sufficient distance to permit insertion of a cylindrical ring 60 which is arranged to have its upper end 62 abut th stator core. Ring 60 effectively serves as a substitute fo portion 44 of the trapezoidal ring. In this construction a steel plate 64 provided with fingers 66 permits the en turns 14 to protrude outwardly therethrough. The pres sure is maintained in the stator laminations by a ring 6 which is held in position against the plate 64 by a bar 7 which is welded to the plate 68 at 72. This constructio is such that after the welds on both ends of the core hav been made, subsequent cooling of the parts causes contra tion of the unit, thus imposing and maintaining axial restraint on the laminations. The other end of ring 60 fits into a shoulder 74 provided on an additional heavier ring 76 which assumes the strength function of the trapezoidal ring previously disclosed. A clearance of 1–10 mils is provided between the surfaces at 78 to permit deflection of the inner portions of ring 76 when subjected to axial pressures exerted by the hydraulic fluid. A shoulder 80 into which the outer edge of ring 76 rests is provided with zero clearance and this is made possible by the insertion of a retaining ring 82 provided near the bottom end of the casing. As previously described, an additional ring 84 is welded into place to seal the unit. The stator can is also welded to ring 76 at 86.

This construction is considerably simplified from that previously described by utilizing two rings 60 and 76 with sufficient clearances therebetween to account for deformation of the parts, while simultaneously providing a construction that can be removed easily if necessary.

In view of the above, it will be evident that many modifications and variations are possible in light of the above teachings. Although specific application of the principles has been made to a canned motor, it will be apparent that they apply with equal validity to any type of vessel wherein one side and end are subjected to very high pressures while internal parts thereof are at a much lower or atmospheric pressure. It therefore is to be understood that within the scope of the appended claims, the invention may be practiced otherwise than as specifically described.

What we claim as new and desire to secure by Letters Patent of the United States is:

1. A device for closing and protecting a container against radial and axial external pressures comprising an object enclosed by a shell extending axially beyond an end thereof, a cylinder positioned in the inner portions of said object and having an end extending axially therefrom for cooperation with said shell to form a space therebetween, first means closing and sealing an end of said space defined by the shell and cylinder, thereby providing a dead air space in the container, second means adjacent said object and extending the width of said space for absorbing radial forces applied thereto, said first means comprising an annular member having its inner surface in contact with said cylinder and its outer surface engaging said shell, means on an end of said annular member arranged for engagement by said second means and provided with an axial clearance selected in accordance with forces adapted for application against said container so as to permit said annular member to absorb a major portion of said forces prior to transmitting the remaining part thereof to said second means, said second means and said annular member being further effective in absorbing the radial forces applied to said container without deforming, means respectively sealing said cylinder and said shell with said annular member, thereby providing a construction resistant to the effects of forces while simultaneously providing a seal against leakage of fluid into said container.

2. A device for closing and protecting a container against radial and external pressures comprising an object enclosed by a shell extending axially beyond an end thereof, a cylinder positioned in fluid-tight engagement with the inner portions of said object and having an end extending axially therefrom for cooperation with said shell to form a space therebetween, first means closing and sealing an end of said space defined by the shell and cylinder, second means positioned adjacent said object and extending the width of the said space for absorbing radial forces applied thereto and thereby preventing deformation of said cylinder, said first means comprising in annular member having its inner surface in contact with said cylinder and its outer surface engaging said shell, an end on said annular member comprising a flange fitted into said second means but provided with a radial clearance therebetween, said clearance being selected in accordance with forces adapted for application to said cylinder so that said cylinder and a portion of said second means absorb a part of the total radial forces applied to the cylinder prior to having the remaining part of such forces absorbed by said flange, and an axial clearance between said flange and said second means for permitting the first means to absorb a portion of the axially acting forces before the remaining part thereof is transmitted to the second means, thereby providing a construction capable of absorbing radial and axial forces without deformation of the parts while simultaneously preventing leakage of a liquid into said space.

3. The combination according to claim 2 wherein said first means comprises a ring of trapezoidal configuration.

4. The combination according to claim 2 wherein said second means comprises an annular ring having its outer surface positioned in contact with said shell, and a cylindrical backing plate between said annular ring and said cylinder.

5. A motor comprising a stator enclosed in a stacking shell and having a cylindrical can fixed to its inner surface and arranged to extend a distance outwardly therefrom, a rotor in said stator having a cylindrical can shrunk on its outer surface and arranged to form an air gap with the stator can, end turns on coils in said stator projecting outwardly into the space defined by said stator can and said shell, first means closing the space defined by said stator can and said shell thereby providing a dead air space in which said end turns are positioned, said first means comprising an annular member having its inner surface in contact with said can, second means positioned between said shell and said can and in abutting relationship with said stator and being disposed axially thereof, a flange on said annular member coacting with said second means and being provided with a clearance therebetween, so that when radial and axial forces are applied to said stator can and to said first means, said clearance is effective to provide a slight deforming action on the part of said flange for absorbing the major portion of forces in said air gap before transmitting the remaining part to said second means.

6. A motor comprising a stator enclosed in a stacking shell and a cylindrical can expanded into contact with its inner peripheral surface, a rotor in the stator bore and having a like can provided on its outer peripheral surface, thereby forming an air gap for the motor, end turns on stator coils extending outwardly into the space defined by said stator can and said shell, a trapezoidal shaped ring having its inner and outer surfaces respectively in contact with said stator can and said shell closing the space therebetween to provide a dead air region in which said end turns are located, an annular member on said trapezoidal ring extending axially along the stator bore and in contact with the outer surface of the stator can, means adjacent said stator and having its inner and outer surfaces respectively in contact with said can and said shell, a flange on said annular member positioned in an annular shoulder provided in said means and being equipped with a clearance therebetween, means sealing said can and said shell with said annular member, whereby said annular member and said means are effective in absorbing radial and axial forces imposed on said can without deforming while simultaneously maintaining said end turns in a dead air space.

7. The combination according to claim 6 wherein said means comprises a finger flange having inwardly directed fingers for spacing said end turns, a cylindrical backing plate interposed between said finger flange and said can for absorbing the radial forces being applied to said can.

8. A motor comprising a stator enclosed in a stacking shell and a cylindrical can expanded into contact with its inner peripheral surface, a rotor in the stator bore and having a like can provided on its outer peripheral surface thereby forming an air gap for the motor, end turns on stator coils extending outwardly into the space defined by said stator can and said shell, a ring having its inner and outer surfaces respectively in contact with said stator can and said shell closing the space therebetween to provide a dead air region in which said end turns are located, an annular member extending axially along the stator bore and in contact with the outer surface of the stator can, a finger flange in contact with the stator laminations and having its outer surface placed in fluid-tight relationship with inner surface of said shell, inwardly directed fingers on said flange for spacing said end turns and terminating a distance from said can, and said annular member extending along the length of said stator can and terminating at a point adjacent said stator, and a clearance provided between the other end of said annular member and said ring for permitting the application of axial directed forces to said annular member without causing distortion thereof, and means respectively sealing the inner and outer sides of said annular member with said member and said shell.

References Cited in the file of this patent

UNITED STATES PATENTS

| | | |
|---|---|---|
| 2,128,544 | Surjaninoff | Aug. 30, 1938 |
| 2,804,556 | Schanz | Aug. 27, 1957 |
| 2,887,062 | Cametti | May 19, 1959 |